United States Patent
Holmdahl

(10) Patent No.: US 9,817,999 B2
(45) Date of Patent: Nov. 14, 2017

(54) PERFORMING DEMAND RESET IN A SECURE MOBILE NETWORK ENVIRONMENT

(71) Applicant: Itron, Inc., Liberty Lake, WA (US)

(72) Inventor: Bret Gregory Holmdahl, Greenacres, WA (US)

(73) Assignee: Itron, Inc., Liberty Lake, WA (US)

(*) Notice: Subject to any disclaimer, the term of this patent is extended or adjusted under 35 U.S.C. 154(b) by 662 days.

(21) Appl. No.: 13/836,821

(22) Filed: Mar. 15, 2013

(65) Prior Publication Data

US 2014/0214728 A1 Jul. 31, 2014

Related U.S. Application Data

(60) Provisional application No. 61/757,902, filed on Jan. 29, 2013.

(51) Int. Cl.
*G06F 17/00* (2006.01)
*G06F 21/72* (2013.01)
(Continued)

(52) U.S. Cl.
CPC .......... *G06F 21/72* (2013.01); *G01D 4/002* (2013.01); *G01D 4/006* (2013.01); *G06Q 20/145* (2013.01);
(Continued)

(58) Field of Classification Search
CPC .. H04Q 9/00; H04Q 2209/40; H04Q 2209/60; H04Q 2209/50; G01D 4/002;
(Continued)

(56) References Cited

U.S. PATENT DOCUMENTS

| 2002/0116633 A1* | 8/2002 | Kobayashi ............. G06F 21/53 726/26 |
| 2006/0161554 A1* | 7/2006 | Lucovsky ............. G06F 21/335 |

(Continued)

FOREIGN PATENT DOCUMENTS

| WO | WO2008086213 | 7/2008 |
| WO | WO2010096923 | 9/2010 |

OTHER PUBLICATIONS

PCT Search Report and Written Opinion dated May 20, 2014 for PCT Application No. PCT/US14/13622, 9 Pages.
(Continued)

*Primary Examiner* — Igor Borissov
(74) *Attorney, Agent, or Firm* — Lee & Hayes, PLLC

(57) ABSTRACT

Techniques are discussed for performing a demand reset in a wireless meter reading environment, in a manner such that demand data may not be lost. In response to receiving a command from a mobile device of a requester, a meter may store demand value(s) in a log, reset register(s) that store the demand value(s) and wirelessly provide the demand value(s) to the mobile device of the requester. Due to the lack of reliability associated with wireless communications between the meter and a requestor, the requestor may not actually receive the demand value(s). Upon receiving a subsequent command for the demand value(s), the meter may determine that the command is a replay, and provide the demand value(s) without resetting the register(s). Techniques are also discussed for generating the commands, securing the commands, and providing the commands to mobile devices in route packages.

19 Claims, 5 Drawing Sheets

(51) Int. Cl.
*G06Q 20/14* (2012.01)
*G06Q 50/06* (2012.01)
*G01D 4/00* (2006.01)
*H04Q 9/00* (2006.01)
*H04L 29/06* (2006.01)
*H04L 9/08* (2006.01)
*H04L 29/08* (2006.01)

(52) U.S. Cl.
CPC ............ *G06Q 50/06* (2013.01); *H04L 9/0825* (2013.01); *H04L 29/08* (2013.01); *H04L 63/062* (2013.01); *H04Q 9/00* (2013.01); *H04L 67/12* (2013.01); *H04L 2463/062* (2013.01); *H04Q 2209/10* (2013.01); *H04Q 2209/25* (2013.01); *H04Q 2209/40* (2013.01); *H04Q 2209/50* (2013.01); *H04Q 2209/60* (2013.01); *Y02B 90/241* (2013.01); *Y02B 90/243* (2013.01); *Y04S 20/32* (2013.01); *Y04S 20/325* (2013.01); *Y04S 40/24* (2013.01)

(58) Field of Classification Search
CPC ...... G01D 4/006; G06Q 20/145; G06Q 50/06; Y04S 20/325; Y04S 20/32; H04L 67/12; Y02B 90/241; Y02B 90/243

USPC ........... 705/412, 63, 64; 340/870.02, 870.03, 340/870.06
See application file for complete search history.

(56) References Cited

U.S. PATENT DOCUMENTS

| | | |
|---|---|---|
| 2008/0117076 A1 | 5/2008 | Klaus et al. |
| 2010/0176967 A1* | 7/2010 | Cumeralto ............ G01D 4/006 340/870.02 |
| 2012/0173873 A1 | 7/2012 | Bell et al. |
| 2014/0211939 A1 | 7/2014 | Holmdahl |

OTHER PUBLICATIONS

PCT Search Report and Written Opinion dated Apr. 16, 2014 for PCT Application No. PCT/US14/13614, 10 Pages.

* cited by examiner ed the demand value(s). In this manner, the meter is able to avoid performing a duplicate reset while providing the demand value(s) to the requestor.

PERFORMING DEMAND RESET IN A SECURE MOBILE NETWORK ENVIRONMENT

CROSS REFERENCE TO RELATED APPLICATIONS

This application claims priority to U.S. Patent Application Ser. No. 61/757,902, filed on Jan. 29, 2013, and entitled "Performing Demand Reset in a Secure Mobile Network Environment", the entirety of which is incorporated herein by reference.

BACKGROUND

Electricity, natural gas and water are examples of consumables that may be monitored, delivered and sold within a metered environment. The metered environment may be configured in an automated meter reading (AMR) configuration and/or an advanced metering infrastructure (AMI) configuration. A first example of the metered environment operates according to a mobile mode or state. In the mobile mode, meters may transmit consumption related messages and receive commands, programming or other messages over one or more radio frequencies (RF). The messages may be transmitted/received by a mobile or portable device, which may include a vehicle-based or handheld meter reading devices. A second example of the metered environment operates according to a fixed network mode or state. In the fixed network mode, metering devices are configured as nodes in a fixed network (e.g., a "mesh network" or a "star network") wherein messages are passed to and from nodes directly or indirectly via a root node or other data collection system.

In many environments, a utility company needs to provide adequate infrastructure and capabilities to not only support normal consumption of consumables, but also provide adequate infrastructure and capabilities to support peak consumption demand. Commonly, utility companies will measure and record peak consumption loads in time intervals over a billing cycle, and use the measured peak loads to bill customers in order to compensate for the overall cost (energy/resource plus necessary infrastructure) of supporting these peak loads.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
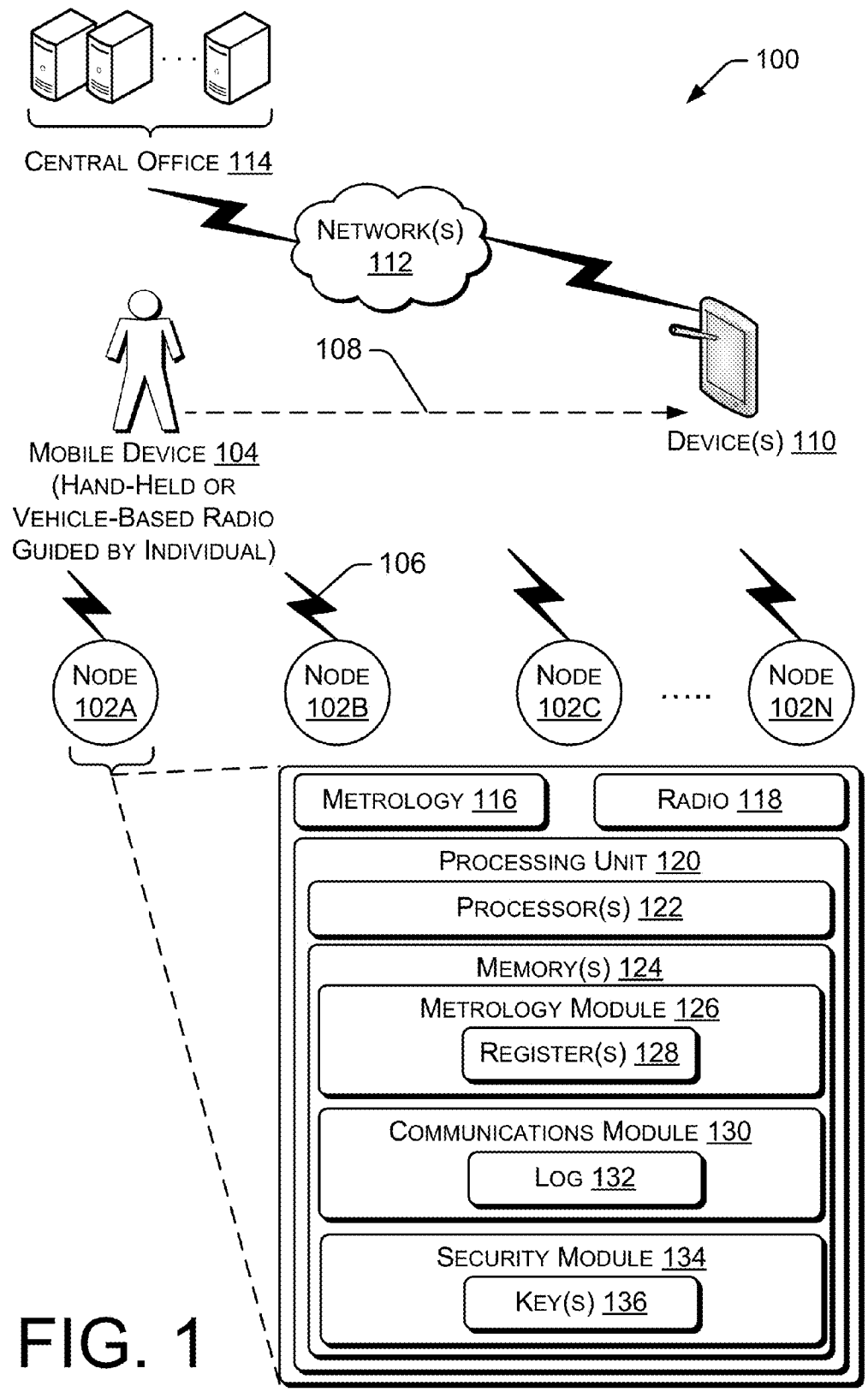
FIG. 1 is a block diagram showing an example of operation of utility meters in a metered environment configured as a mobile mode system for performing demand requests.

Typically, on a cycle basis, utility companies (i.e., utilities) collect the current billing period's peak demand value from utility meters. Once collected, the utility generally resets one or more demand values in the meter, so that collection of peak demand values may be initiated for the next billing period. This operation clears the demand value generally located in one or more registers of a meter. Traditionally, demand reads have been collected visually, where demand values are reset with a manual operation. Alternatively, optical probing methods allowed demand reads to be collected at the meter, and if successful, a subsequent reset demand request was performed via the optical interface to reset the demand values. Both of these collection techniques provide a highly reliable process that prevents the demand value from being reset prior to the collection of the current read of the peak demand value.

In mobile and fixed network meter reading systems, managing the process associated with reading and resetting demand data introduces a new set of issues. Communications within mobile meter and fixed network reading systems are inherently intermittent and somewhat unreliable. To prevent the loss of demand data in these environments, a design should allow for collecting and resetting demand values in a manner that couples the collecting and resetting operations together, and supports a replay of previously issued RF-based commands used to request the demand related functions.

A demand reset is a destructive operation, in that a reset demand request resets or clears demand registers in a meter. If demand registers are reset, yet associated demand values have not been captured prior to performing the reset, the demand data is lost.

This disclosure describes techniques for performing a demand reset in a wireless fixed network, and/or wireless mobile, meter reading environment, in a manner such that demand data is not lost. As an example, a meter may receive a radio frequency (RF) command (e.g., message, demand reset command, etc.) that includes a collect demand data request for a peak demand value stored in a register of the meter. In response to the request, the meter may store the peak demand value(s) in a log and wirelessly provide the peak demand value(s) to the requester. The collect demand data request may be packaged with a reset demand instruction to instruct the meter to reset the register after the peak demand value has been stored in the log. The command may include a unique tracking identifier (ID) that uniquely identifies the command.

Due to the lack of reliability associated with wireless communications between the meter and the requestor, the requestor may not actually receive the demand value(s) in response to the command. In this event, the requestor, or a different requestor, may reissue the command to the meter to obtain the corresponding demand value(s). Upon receiving the command, the meter may determine that the command is a replay (e.g., a command that the meter has previously processed that resulted in a reset of the register(s) that contained the demand value(s)). In this event, the meter may wirelessly provide the peak demand value(s) from the log to the requester without resetting the register(s) that contained the demand value(s). The command may be constructed in a manner that allows the meter to determine whether the command is a replay or not.

The discussion herein includes several sections. Each section is intended to provide examples of techniques and/or structures, but is not intended to indicate elements which must be used and/or performed. A section entitled "Example Mobile Mode Environment" discusses aspects of meters which are constructed and programmed for providing demand values from within a mobile mode environment. A section entitled "Example Network Mode Environment" discusses aspects of similar meters operating within a network mode environment. A section entitled "Example Management of Secured Reset Demand Commands" discusses example generation of demand commands. A section entitled "Example Methods" discusses example operations to perform demand requests and generate demand request commands. A brief "Conclusion" follows these sections. This brief introduction is provided for the reader's convenience and is not intended to describe and/or limit the scope of the claims or any section of this disclosure.

Example Mobile Mode Environment

FIG. 1 shows an example metered environment configured as a mobile mode system 100. The mobile mode system 100 includes a plurality of utility meters that may measure consumption of electricity, natural gas, water and/or other consumable resources. Each meter may be integrated with a radio and data processing functionality, and may constitute a node within the mobile mode system 100. As an example, nodes 102A through 102N represent smart meters that transmit information to a radio of a mobile device 104, which may be a hand-held or a vehicle-based wireless meter reading device. As another example, nodes 102A through 102N may represent smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other network devices. The mobile device 104 may include a radio, a processor, memory and software, and may be guided and/or operated by an individual. The nodes 102 may communicate with the mobile device 104 by means of radio frequency (RF) transmissions 106. The transmissions 106 may be broadcast periodically, randomly, on demand, or at another interval or frequency, and may include a consumption message (e.g., a standard consumption message that indicates node identification, a meter reading, a consumption value, and/or a date and time, etc.) and/or command/response messages. Mobile device 104 may send commands, such as secure encrypted commands, to nodes 102, and in response, receive corresponding response messages that include one or more demand values and optional associated information stored in nodes 102.

The mobile device 104 may be moved along a route 108, which may bring it into proximity to a plurality of nodes 102A through 102N. As the mobile device 104 passes along the route 108, it may gather data from consumption messages in transmissions 106 from the nodes 102, and transmit commands to the nodes 102 and receive response messages (e.g., containing demand value(s)) from the nodes 102 in transmissions 106. The data gathering process may be performed by an internal data processor (e.g., microprocessor, memory, software and/or ASIC) and a radio in mobile device 104. Those consumption and other messages may be aggregated in a desired format and stored in a computing device 110. The computing device 110 may transmit the consumption, demand value and other information over one or more networks 112 (e.g., a local area network, neighborhood area network, a cellular network, intranet, Internet, or the like), and/or provide the consumption, demand value and other information by other means (e.g., file download) to a central office 114 or other data storage and/or processing facility.

Details of node 102A are shown in FIG. 1 as an example of structure and function that may be utilized in one or more nodes. Metrology 116 is representative of resource consumption measurement devices for measurement of electricity, natural gas, water, etc. The radio 118 may function both as a receiver and/or a transmitter. In the example of FIG. 1, the radio 118 may receive and/or send transmissions 106 from and/or to the mobile device 104. The transmissions 106 may include consumption data (e.g., obtained from metrology 116), commands transmitted by mobile device 104 to individual nodes 102 and/or other data such as response messages containing demand values.

A processing unit 120 may include one or more processors 122 in communication with one or more portions of memory 124. The processing unit 120 may receive data from, and/or communicate with, the metrology 116 and the radio 118. The processor 122 may be a microprocessor, microcontroller, application specific integrated circuit (ASIC) or other device configured to process data.

The memory(s) 124 may include multiple separate memories and include programs, modules, applications and/or data files, and may be read from, and/or written-to, by the processor(s) 122. Metrology module 126 may interface with metrology 116 to collect consumption and/or demand data (e.g., demand values) for a resource, such as electricity, gas, water, etc. Metrology module 126 may be configured to collect demand values in one or more registers 128. Demand values may include a measure of peak demand and/or peak consumption for a resource. As an example, metrology module 126 may measure resource demand in various time intervals (e.g., contiguous 15 minute time intervals), and maintain a highest or peak demand load value in an associated time interval in register(s) 128.

As an example, in a first time interval, metrology module 126 may measure a peak demand of 100 kilo-watts/hour and store that as a demand value in register 128. In a second time interval, metrology module 126 may measure a demand of 80 kilo-watts/hour. Since 100 is greater than 80, metrology module 126 would not store that value (e.g., 80) in register 128. Continuing this example, in a third time interval, metrology module 126 may measure a demand of 180 kilo-watts/hour. Assuming that this measurement in the third time interval is the highest or peak load measurement over all time intervals in a collection period, register 128 would maintain the peak load demand value of 180 kilo-watts/hour. As an example, a collection period may be defined as a billing cycle (e.g., 30 days), such as a time between a first time mobile device 104 is moved along a route 108, which may bring it into proximity to a plurality of nodes 102A through 102N, and a second later time device 104 is moved along a route 108.

In another example, registers 128 may store the peak demand value (e.g., 180 kilo-watts/hour) over a corresponding time interval during a billing cycle, as well as one or more other demand values that are within a predetermined threshold of the peak demand value and/or a number of the one or more other demand values that are within the predetermined threshold of the peak demand value. With this demand value information provided in a response, a utility company may be able to determine not only the peak demand value of a customer during a billing cycle, but also an indication of how many time intervals a customer consumed a resource near the peak demand value during the billing cycle.

Communications module 130 may be configured to interface with radio 118 to receive a command in a radio frequency (RF) message from device 104 requesting demand values, and transmit an RF response message according to the demand values. The command may include a collect demand data request (e.g., requesting demand values) and a reset demand instruction (e.g., requesting a reset of a demand value register(s)). The demand values may comprise peak load demand information and/or peak load usage information pertaining to a resource measured by a node 102. Communications module 130 may be configured to communicate with metrology module 126 to obtain and store demand values from register(s) 128 in log 132, reset one or more register(s) 132 and obtain a status of the reset of the one or more register(s) 132. As an example, communications module 130 may execute an instruction to get one or more values (e.g., name/value pairs) from registers 128, and execute an instruction to reset registers 128. In an embodiment, register(s) 128 and log 132 are in physically separate memories of memory(s) 124 (not shown). In another embodiment, register(s) 128 are in a memory of metrology 116 (not shown) accessible by metrology module 126 and/or communications module 130.

Demand metering may provide a mechanism to measure and record peak loads over relatively short interval periods. These demand reads are commonly used to bill customers in order to compensate for the overall cost (energy plus necessary infrastructure) of supporting these peak loads. Typically, on a cycle basis, utilities (e.g., utility companies) collect the current billing period's peak demand value, and once collected, reset the demand value (e.g., reset register(s) 128) in node 102 for the next billing period. This operation clears the demand value in register 128 and may initiate a new billing period.

Traditionally, demand reads have been collected visually and reset with a manual operation. Alternatively, optical probing methods allowed demand reads to be collected, and if successfully validated, a subsequent reset demand request was performed via the optical interface to reset a register, such as register 128. Both the manual and the optical probing methods provide a highly reliable process that prevents the demand value from being reset prior to the collection of the current read of the demand value.

However, in a mobile meter reading system (e.g., FIG. 1), managing the process associated with reading and resetting demand data introduces a new set of issues. Communications within mobile meter reading systems are inherently intermittent and somewhat unreliable. To prevent the loss of demand data in this environment, a design is necessary that allows for collecting and resetting demand in a manner that 1) couples the resetting demand operations together and 2) supports a replay of the RF-based commands used to request the demand related functions or values.

Reset demand (e.g., execution of a reset demand instruction) is a destructive operation. In that, within a node 102, a reset demand instruction clears demand registers (e.g., registers 128). As an example, for a single phase meter, there may be a single demand value, where a poly-phase meter may have 3 or more demand values. The significance of this is that if the demand value is not captured prior to performing the reset, the demand values are lost.

When dealing with reset demand in, for example, the optical probing space, issues exist stemming from lost demand data if a demand reset is performed before validating and persisting the demand data. Thus, a serial process may commonly be utilized. This serial process may involve opening a session with the meter, obtaining register data, persisting the data on an optical handheld device, closing the session, and parsing/validating the required read items. Only at that time, does the application open a new session and submit the reset demand. These steps may be largely contained within a single process which makes some of the complexity manageable.

For a meter in a wireless meter reading system, managing the guarantee of demand data collection prior to performing the demand reset is significantly more complex. This is due to the multiple layers that are involved in the process and the lack of reliability associated with wireless communications between nodes 102 and a potentially moving target (e.g., vehicle or other mobile collecting entity 104). A possible, but complex, solution to the problem is to have a 2-step process similar to the optical probing model. A first request may collect the demand data from node 102, process the data in mobile device 104 to verify that valid data has been persisted, and then send a second request to node 102 to reset register(s) 128. This involves several layers, presents performance challenges, and still requires an acknowledgement from a node 102 to ensure the demand reset actually occurred.

As an alternate example, a command from mobile device 104 may include a collect demand data request packaged, for example, with a reset demand instruction. As a part of assuring that reset demand commands are secured, a unique tracking identifier (ID) is included with the command. This tracking ID provides a means, at least in part, to determine if the command has already been processed by a node 102. In knowing this, the same command may not generally be used to force multiple demand resets (e.g., resetting register(s) 128) in a collection period, and provides a mechanism to respond to the reader (e.g., mobile device 104) with the original response to the command. The response message provided in response to the command may include:

Status of the reset demand instruction for register(s) 128.
Timestamp of the demand reset.
Demand values collected from register(s) 128 immediately prior to executing a reset demand instruction. (The demand values may include a maximum demand value and may optionally include related cumulative and continuous cumulative demand values).
For maximum demand values, the time of occurrence.
Indications if the response is a result of a replay.
A meter identifier (ID).
Tracking ID of command.

This response data may be maintained by communication module 130 in log 132 (e.g., a rolling historical log with an example depth of 16). Thus, log 132 may contain the results of previously processed reset demand commands.

As an example, upon receiving a command from mobile device 104, communications module 130 may determine whether the command is valid using a variety of techniques, such as successful decryption of the command, comparing a hash code of the command with one or more known hash codes, or the like. In response to determining that the command is not valid, communications module 130 may be configured to generate a security failure response and send an RF response message according to the security failure response to mobile device 104 or central office 114.

In response to determining that the command is valid, communications module 130 may determine whether the command is a replay. A replay is an attempt to execute a subsequent (e.g., identical) command having an identical tracking ID to collect demand values with a reset demand instruction that has already been processed by a previous command, such that demand values have previously been reset in register(s) 128 in response to the previous command.

As an example, communications module 130 may be configured to maintain a list of tracking IDs in memory 124 associated with previously received commands, and determine if a currently received command has a tracking ID that matches a tracking ID on the list. If a command is received with a tracking ID that matches a tracking ID on the list, communications module 130 determines that the currently received command is a replay, and does not initiate a reset of register(s) 128. If a command is received with a tracking ID that does not match a tracking ID on the list, communications module 130 determines that the currently received command is not a replay.

In the event the command is not a replay, communications module 130 may extract appropriate demand value(s) from register(s) 128, persist and store the demand value(s), along with associated data (e.g., status, timestamp data, etc.) in log 132. Upon verifying that data has been properly stored in log 132, communications module 130 may issue, or cause the execution of, a reset demand instruction to reset demand value(s) in register(s) 128. Communications module 130 may also log an indication and time of occurrence (e.g., date, timestamp, etc.) in log 132 that registers 128 were successfully reset.

In the event that the command is resent to node 102, communications module 130 may determine that the command is a replay. As an example, communications module 130 may extract the tracking ID from the resent command and compare the tracking ID in the resent command to the list of tracking IDs of previously received commands. If there is a match, communications module 130 may extract associated data from log 132 and send (e.g., transmit via radio 118) an RF response message according to the demand values, along with associated data, without resetting the demand values in register(s) 128. Therefore, if a requestor of the demand values transmits a command to a meter, such that the command is a replay, the requestor will get demand values from the meter that are associated with a current billing cycle.

Therefore, in the event that a meter receives a command that is determined to be a replay, metrology module 126 may continue to store peak demand values occurring over a corresponding time interval that exceed previous peak demand values occurring over other time intervals in register(s) 128 for a subsequent billing cycle. Therefore, by determining that a command is a replay, communications module 130 will not reset register(s) 128, and not affect any stored peak demand value for the subsequent billing cycle.

As an example, at a first point in time, node 102A may have stored in register(s) 128, a peak demand value of 180 kilo-watts/hour. While traveling route 108, mobile device 104 may issue a command to read this peak demand value, thereby clearing, erasing or resetting this value in register(s) 128. Without the replay determination capability of communications module 130, at a second point in time, a same or different mobile device 104 may issue the same command (e.g., command having the same tracking ID) to node 102A. At this second point in time, node 102A may have a demand value of only 80 kilo-watts/hour stored in register(s) 128. Therefore, without the ability to determine a replay, the demand value recorded at the first point in time may be lost, such that the actual peak demand value is not captured.

Register(s) 128 may be part of, or separate from, memory used to store log 132. As such, register(s) 128 and log 132 may share a same memory 124, or register(s) 128 and log 132 may be in different physical memories of memories 124 or other memory (not shown).

Therefore, for a particular collection cycle, it may be important that a single mobile device 104 not have multiple demand reset commands (e.g., a collect demand data request and a reset demand instruction) having different tracking IDs for a same node (e.g., node 102A). Additionally, for a particular collection cycle, it may be important that multiple mobile devices 104 that may travel on route 108 not have multiple demand reset commands (e.g., a collect demand data request and a reset demand instruction) having different tracking IDs for a same node (e.g., node 102A). This is because if a node received two demand reset commands with differing tracking IDs for a particular collection cycle, the node may not discern that one of the demand reset commands is a replay. Therefore, proper management of tracking IDs associated with demand reset commands for meters may be crucial if meters are to easily determine commands that are replays.

Additionally, some or all of nodes 102 may be secured, such that received commands as well as responses or readings are encrypted. Security module 134 may be used to provide security features to nodes 102. To facilitate communication security, security module 134 may store one or more security keys 136 used to decrypt various commands, and encrypt various transmissions.

Security module 134 may be configured to detect and report unauthorized access to a node, or unauthorized access attempts to a node to mobile device 104 and/or central office 114. As an example, security module 134 may detect and/or report unauthorized access attempts to reset one or more registers 128.

Example Network Mode Environment

Figure 2:
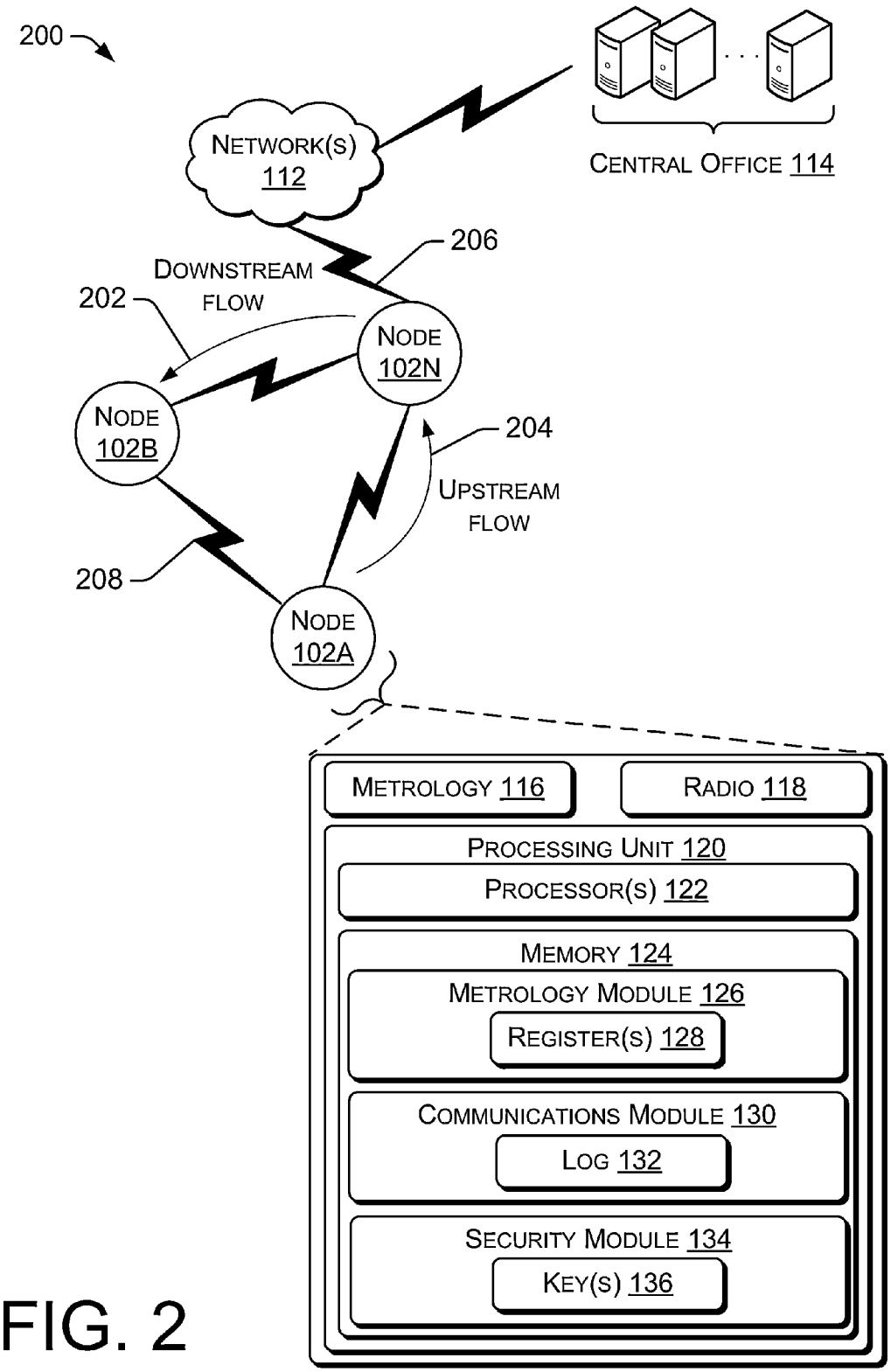
FIG. 2 is a block diagram showing an example of operation of utility meters in a network mode or configuration for performing demand requests.

FIG. 2 shows an example metered environment configured as a network mode system 200. The network mode system 200 includes a plurality of utility meters that may measure consumption of, and/or demand for, electricity, natural gas, water or other consumable resource. Each meter may be integrated with a radio and data processing functionality, and may constitute a node within the network mode system 200. In the example, nodes 102A through 102N may represent smart meters that transmit information through a mesh network. The information may include downstream flows 202 of packets, which may include commands and information passing through a network 112 and originating from the central office 114. The information within the mesh network may include upstream flows 204 of packets, which may include data obtained from the metrology 116 and reported to the central office 114. Both the downstream data flows 202 and upstream data flows 204 may be made over RF links 206 between various nodes and/or other networks. Therefore, networks illustrated in example environment 200 may be used to process commands (e.g., that include a collect demand data request and a reset demand instruction) as described in FIG. 1. Thus, instead of demand reset commands (e.g., commands containing a collect demand data request and a reset demand instruction) being sent by mobile device 104, as described above with respect to FIG. 1, a demand request command may be sent to nodes 102A-102N by central office 114, as shown in example environment 200 of FIG. 2. Moreover, responses to demand request commands may be provided to central office 114 by nodes 102A-102N. In example environment 200 of FIG. 2, central office 114 may be configured to replace the functionality, or work in conjunction with, mobile devices 104 as described with respect to FIG. 1.

The network mode system 200 may be configured as a mesh network (as shown in FIG. 2) or as a "star" network (in other embodiments). In a mesh network configuration, nodes 102A and 102B may communicate over a link 208. However, in a star configuration, link 208 may be missing, and nodes 102A and 102B may communicate directly with a center node 102N of the star (e.g., a data collector).

Example Management of Secured Reset Demand Commands

As an example, with respect to example environment 100 of FIG. 1, each mobile device 104 may have reset demand commands (e.g., a collect demand data request and a reset demand instruction) for a unique set of nodes 102 associated with one or more unique routes, such as route 108. Configuring commands in mobile devices 104 in this fashion may minimize replays in nodes, since no two or more mobile devices 104 contain a reset demand command for a same node.

However, this type of configuration may not always be possible, as mobile devices 104 may be required to share routes. As an example, one mobile device 104 may start on one end of route 108 and another mobile device 104 may start on an opposite end of route 108, and travel toward each other in an attempt to meet near the middle of route 108 while commanding/reading nodes 102A-102N. Since one mobile device 104 may process meter command/readings faster than the other mobile device 104, both mobile devices 104 may be required to have commands for overlapping sets of nodes 102 on route 108. Additionally, commands need to be secured (e.g., encrypted) in a manner that is compatible with each associated meter.

A meter reading application server (e.g., server 302 of FIG. 3) may be configured to determine, generate and provide route packages containing secured commands to mobile devices 104. A route package may contain one or more routes, such as route 108, such that each route contains a list of meters for command/collection by mobile devices 104. The meter reading application server may provide reset demand request management for mobile devices 104 by managing how commands, such as reset demand commands, are provided in route packages distributed to mobile devices 104. Additionally, the meter reading application server may manage security for the reset demand commands.

In a first example, a first mobile meter reading device 104 may be associated with one or more unique routes, such that each unique route is associated with a unique set of meters. In this first example, the management provided by the meter reading application server includes verifying that none of the unique set of meters are associated or included in other routes that differ from the one or more unique routes. The management may further include verifying that none of the one or more unique routes are included in a route package associated with a meter that differs from the first mobile meter reading device 104. The management may further include verifying, for a collection cycle, that no two or more reset demand commands for a same meter have different tracking IDs, which may prevent the meter from detecting a replay of a reset demand command.

In a second example, where route packages are sent to multiple mobile devices 104 that may share one or more routes, or sent to the same mobile device(s) 104 over multiple days, the meter reading application server is responsible for verifying, for a collection cycle, that no two or more reset demand commands for a same meter have different tracking IDs, which may prevent the meter from detecting a replay of a reset demand command. This may be required to assure that only one reset demand is performed for each request and that the original demand data can be retrieved from the node 102.

Therefore, how meters are mapped to routes, how routes are configured and provided to mobile devices 104 and how commands are encrypted may require a high degree of management.

Figure 3:
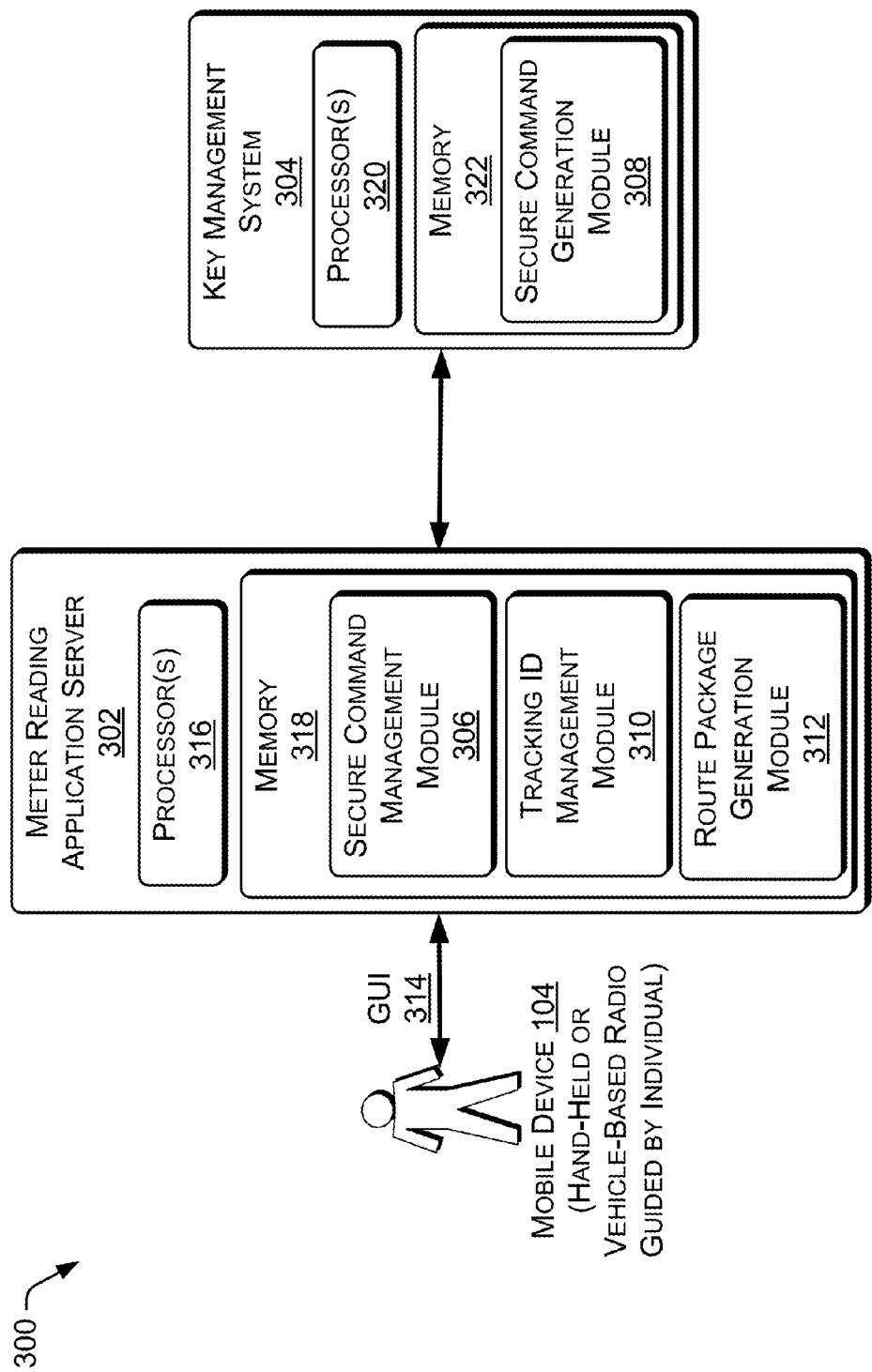
FIG. 3 is a block diagram showing an example system for generating demand commands.

FIG. 3 is an example environment 300 to illustrate a system view of management of secured reset demand commands using a meter reading application server, such as meter reading application server 302.

As an example, meter reading application server 302 may use key management system 304 to provide secure commands (e.g., reset demand commands) to mobile devices 104. Meter reading application server 302 may be configured to provide a route package, such as for route 108, to mobile device 104. The route package may contain secured commands for nodes 102A-102N, such that the secured commands are correctly associated with security requirements for each of nodes 102A-102N. Meter reading application server 302 may be configured to generate unique tracking IDs for each secured command that may be specific to each of nodes 102A-102N.

Meter reading application server 302 may receive or contain a list of meters for mobile collection associated with, for example, a utility company. As an example, for a mobile device 104, meter reading application server 302 may use secure command management module 306 to authenticate mobile device 104, and based on a group of meters associated with mobile device 104, identify secure commands for mobile device 104. If meter reading application server 302 does not contain one or more secure commands for mobile device 104, secure command management module 306 may request missing secure commands from secure command generation module 308 of key management system 304. Therefore, since some of nodes 102A-102N may contain different encryption/decryption keys, secure command management module 306 may be configured to verify that commands are properly encrypted and/or secured for each of nodes 102A-102N, such that mobile device 104 may successfully communicate with each of nodes 102A-102N. Thus, secure command management module 306 manages authentication of mobile device 104 and association of appropriately secured commands for nodes 102.

Tracking ID management module 310 may be configured to generate a unique tracking ID for a secured reset demand command for each meter (e.g., nodes 102). The tracking IDs may be unique relative to a collection cycle, such as a billing cycle. As an example, a secured command for a particular meter may have a first unique tracking ID for a first collection cycle, and a second unique tracking ID for a second collection cycle. Therefore, tracking ID management module 310 may be configured to verify, for a particular collection cycle, that no two or more identical secured commands for a same meter are generated that have different tracking IDs. Thus, tracking ID management module 310 verifies that a tracking ID is generated for a demand reset command that is unique for a meter, such that for a first time that the meter receives the demand reset command, the meter will not find the tracking ID of the demand reset command in its list of previously processed demand reset commands. As an example, if multiple reset demand commands are generated for a particular meter for a particular collection cycle, tracking ID management module 310 will associate a same tracking ID with each of the multiple reset demand commands. If two or more identical secured commands for a meter are generated having different tracking identifiers, upon receiving the two or more identical secured commands, the meter may not determine a replay and may reset one or more registers of the meter for each of the two or more identical secured commands received.

Route package generation module 312 may be configured to generate and provide route packages to mobile devices 104. Route package generation module 312 may be configured to verify that each route includes a correct list of meters, secured reset demand commands associated with each meter in the list of meters and that routes in route packages are correctly associated with each corresponding mobile device 104. Therefore, route package generation module 312 may be configured to generate route log packages to include routes and at least portions of the secured commands, and provide the route log packages to one or more mobile devices 104.

As an example, meter reading application server 302 may receive, or have previously received, a list of meters for collection from a utility company. As another example, meter reading application server 302 may receive a request from a mobile device 104 to create a route load package associated with a list of meters. The request may be provided via a graphical user interface (GUI) 314 of meter reading application server 302, with a pre-condition that reset demand commands be included in the route load package.

Therefore, with respect to example environment 100 of FIG. 1, meter reading application server 302 may be configured to generate secured commands for a list of meters and verify, for a collection cycle, that no two or more identical secured commands for a same meter of the list of meters are generated having different tracking IDs. Meter reading application server 302 may be configured to generate route log packages to include routes and at least portions of the secured commands and provide the route log packages to one or more wireless mobile devices, such as mobile device 104.

With respect to example environment 200 of FIG. 2, application server 302 may be configured to generate secured commands for meters (e.g., nodes 102A-102N), wherein each of the secured commands contain a unique tracking ID and verify, for a collection cycle, that no two or more identical secured commands for a same meter are generated having different tracking IDs. In an embodiment, application server 302 may be configured to send (e.g., from central office 114) the secured commands to corresponding meters and receive (e.g., by central office 114) responses for the secured commands. In another embodiment, application server 302 may be configured to provide the secured commands to a server or computing device in, for example, central office 114, for sending the secured commands to corresponding meters and receiving responses for the secured commands.

Central office 114 may then determine which, if any, responses (e.g., demand values, timestamps, register reset status, replay indicators, etc.) have not been received from corresponding meters, and resend commands to the corresponding meters.

Meter reading application server 302 may contain one or more processors 316 to execute modules, such as modules 306-312, stored in memory 318. Key management system 304 may contain one or more processors 320 to execute modules, such as module 308 stored in memory 322.

Example Methods

Figure 4:
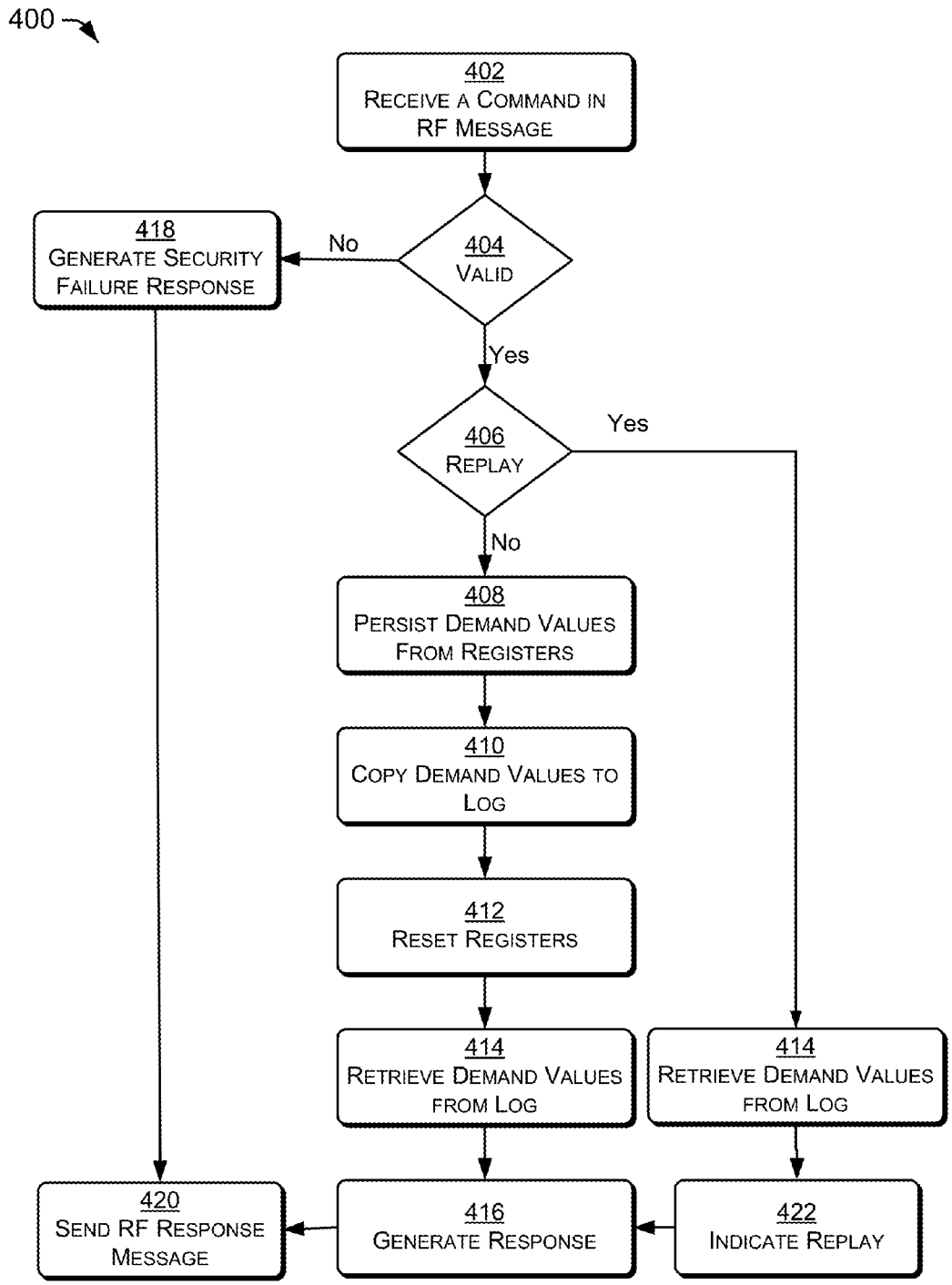
FIG. 4 is a flow diagram showing example operations usable to perform demand requests.
Figure 5:
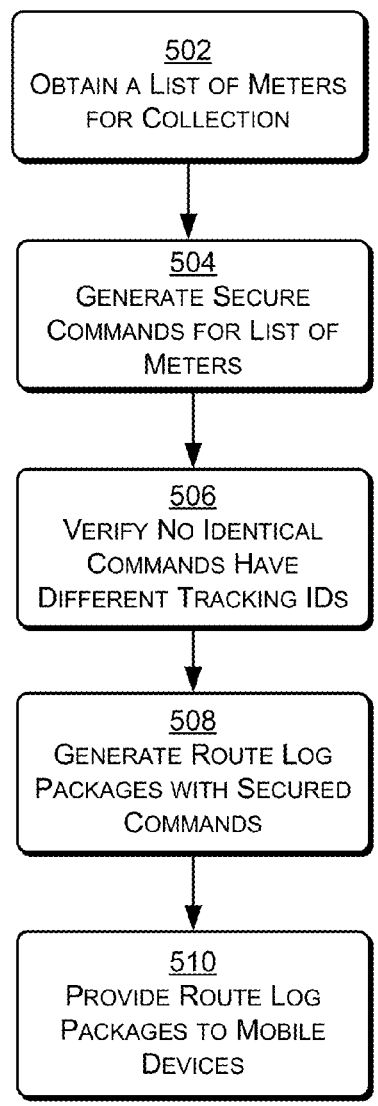
FIG. 5 is a flow diagram showing example operations usable to generate demand request commands.

FIGS. 4 and 5 show operations, methods and techniques that may be represented by a collection of acts, blocks or operations in a logical flow graph, which represent a sequence of operations that can be implemented and/or executed by hardware, software, or a combination thereof. In one example, one or more functional blocks may be implemented by aspects including a microprocessor, a microcontroller, one or more memory devices, application specific integrated circuits, hardware logic, software instructions, subroutines and/or programs, etc.

Memory devices, computer-readable media and/or computer storage media may include volatile and non-volatile, removable and non-removable media implemented according to any techniques or technology for storage of information such as computer-readable instructions, data structures, program modules, or other data. Computer-readable media includes, but is not limited to, random access memory (RAM), read only memory (ROM), electrically erasable programmable read only memory (EEPROM), flash memory or other memory technology, compact disk-read only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. Computer-readable media does not include modulated data signals or carrier waves.

Any such computer-readable media (e.g., memory 124 of FIGS. 1-2 and memory 318 and 322 of FIG. 3) may be part of a system or device (e.g., meter 102, meter reading application server 302 and key management system 304). Moreover, the computer-readable media may include computer-executable instructions that, when executed by the processor(s), perform various functions and/or operations described herein. Such computer- and/or processor-readable memory and/or media may retain the instructions in a persistent and/or non-transitory manner.

FIG. 4 is a diagram 400 showing aspects of an example method of operation regarding processing reset demand commands by a node (e.g., smart meter).

At operation 402, a node, such as a node 102, receives a command in a radio frequency (RF) message, such as via radio 118 of FIG. 1. As an example, the command is a secured command that is transmitted to the node 102 by a mobile device 104. In another example, the command is a secured command that is transmitted to the node 102 by a server or other computing device from central office 114 via, for example, network 112. The command may include a collect demand data request used to retrieve the demand values from the log(e.g., log 132) for transmission to an originator of the command or other entity, and a reset demand instruction to reset the demand values in the one or more registers when the command is not a replay.

At operation 404, a module, such as communications module 130, determines whether the command is valid. As an example, communications module 130 may determine that the command is valid if the command can be successfully decrypted by security module 134, if there is a successful comparison of hash values, hash codes, hash sums or other identifiers of the command, and/or the like.

If the command is determined to be valid, at operation 406, a module, such as communications module 130, determines whether the command is a replay. As an example, communications module 130 compares a tracking identifier (ID) in the command with tracking IDs of previously received commands to determine whether the command is a replay. If the tracking ID of the command matches a tracking ID of a previously received command, the command is determined to be a replay, otherwise, the command is determined to not be a replay.

If the command is not a replay, at operation 408, a module, such as communications module 130, obtains (e.g., executes a get function) demand values from one or more registers (e.g., registers 128) of the meter and persists the demand values. As an example, communications module 130 may get the demand values from registers 128 in response to a request or function sent to metrology module 126. Communications module 130 may persist the demand values to verify or validate that the demand values from registers 128 have actually been received by communications module 130.

At operation 410, the demand values are copied to a log. As an example, after communications module 130 has verified or validated that the demand values are successfully persisted, communications module 130 copies the demand values to log 132. Communications module 130 may verify that the demand values have been successfully copied to log 132. Communications module 130 may also copy information associated with the demand values to log 132 as well as the command requesting the demand value(s).

At operation 412, register(s), such as registers 128 associated with the demand values, are reset. As an example, upon verifying that demand values and any associated information have been successfully copied to log 132, communications module 130 may invoke a reset function to reset register(s) 128 that contain the corresponding demand values. Note that register(s) 128 are described herein as registers that contain demand values. However, some of register(s) 128 may contain other values that are not explicitly demand values that may not be reset by communications module 130 as a part of processing the command. Once demand value registers are reset, metrology module 126 may notify communications module 130 that the reset was successful, and a new collection cycle may be initiated. As such, the meter may start tracking new peak demand values in one or more registers for the new collection cycle.

At operation 414, as a part of servicing the command, the demand values are retrieved from the log. As an example, communications module 130 retrieves demand values, and optionally, information associated with the demand values, from log 132.

At operation 416, the response message is generated. As an example, communications module 130 may include the demand values, as well as additional information in the response message. Such information may include, but is not limited to, timestamp information, time information corresponding to the reset of the demand values, a time of occurrence of a time interval associated with peak load demand information or peak load usage information, an indication of whether the command is a replay, a status of the reset of the demand values, a timestamp of the reset, or the like. The demand values may include peak load demand information or peak load usage information pertaining to a resource measured by the meter prior to the reset of the demand values.

At operation 420, an RF response that includes the response message is sent that may include the demand values. As an example, communications module 130 may format the response message and direct the response message to radio 118 for transmission to mobile device 104 or central office 114.

Returning to operation 404, if the command is not determined to be valid, at operation 418, a security failure response is generated. The security failure response may contain information that includes the invalid command, a description or indication of why the command was invalid, timestamp information associated with the invalid command, or the like.

At operation 420, an RF response message is sent that may include the security failure response. The security failure response may be received by mobile device 104 or central office 114 to indicate an improperly generated command, an unauthorized access attempt at the node, an encryption mismatch indication, a hash or other code mismatch indication, or the like.

Returning to operation 406, if a module, such as communications module 130, determines that the command is a replay, at operation 414, as described above, the demand values are retrieved from log 132 of the meter. As an example, communications module 130 may determine that a tracking ID in the command matches a tracking ID of a previously processed command to determine that the command is a replay. As such, a previously processed command may include a command that resulted in a reset of one or more registers 128.

At operation 422, a replay indication is generated. At operation 416, the response message may be generated to include the replay indication. At operation 420, an RF response that includes the response message and may include the replay indication and the demand values is sent.

As an example, determining whether the command is a replay may be based at least in part on comparing a tracking identifier (ID) in the command to tracking IDs of previously received commands, wherein when the tracking ID of the command matches a tracking ID of a previously received command, the command is determined to be the replay and the one or more demand values are not reset in one or more registers. Conversely, when the tracking ID of the command does not match a tracking ID of a previously received command, the command is determined to not be the replay. In this event, demand value registers are ultimately reset.

The demand values may comprise peak load demand information or peak load usage information pertaining to a resource measured by the meter, such as electricity, gas and/or water. The command may include a collect demand data request packaged with a reset demand instruction. As such, the collect demand data request may be processed to allow the retrieving (e.g., a get function) of the demand values from the corresponding registers. When the command is not a replay, the reset demand instruction may process a demand reset (e.g., a reset function) that may cause the resetting of the demand values in the corresponding registers.

FIG. 5 is a diagram 500 showing aspects of an example method of operation implemented for example, by meter reading application server 302.

At operation 502, meter reading application server 302 obtains a list of meters for collection. As an example, meter reading application server 302 may receive, or have previously received, a list of meters for collection from a utility company. As another example, meter reading application server 302 may receive a request from a mobile device 104 to create a route load package associated with a list of meters. The request may be provided via GUI 314 of meter reading application server 302 with a pre-condition that reset demand commands be included in the route load package. Thus, the list of meters includes meters for collection by device 104.

At operation 504, meter reading application server 302 generates secured commands for the list of meters. As an example, secured commands may be associated with specific meters, such as nodes 102A-102N. Each generated secured command may contain a meter ID associated with one or more meters or unique meter IDs associated with corresponding meters. Commands may be secured (e.g., encrypted) in a manner that is compatible with each associated meter (e.g., compatible with decryption keys of each meter). As such, meters may share certain encryption/decryption keys, meters may share all encryption/decryption keys, meters may each have unique encryption/decryption keys, or combinations thereof. Additionally, one or more meters may not be secured, and thus not contain encryption/decryption keys. Thus, meter reading application server 302 generates secured commands appropriate for a configured security of each meter. Meter reading application server 302 may have stored some or all of the secured commands for each meter of the list of meters. As an example, for those meters that meter reading application server 302 does not have secure commands, meter reading application server 302 may request key management system 304 to provide secure commands. Such a request may trigger key management system 304 to construct the secure commands.

At operation 506, meter reading application server 302 verifies, as an example, for a particular collection cycle, that no two or more identical secured commands for a same meter are generated having different tracking identifiers. As an example, for a given collection cycle, if a node 102 were to receive two different demand reset commands having different tracking IDs, communications module 130 may reset register(s) 128 for each received command. Thus, tracking ID management module 310 verifies that a tracking ID is generated for a demand reset command that is unique for a meter, such that for a first time that the meter receives the demand reset command, the meter will not find the tracking ID of the demand reset command in its list of previously processed demand reset commands. Tracking ID management module 310 may generate tracking IDs that are unique to a collection cycle, such as a billing cycle. As an example, a demand reset command for a particular meter may have a first unique tracking ID for a first collection cycle, and a second unique tracking ID for a second collection cycle. In this manner, the meter will not have a tracking ID for a demand reset command previously stored for a previous collection cycle when receiving a first demand reset command for a current collection cycle.

At operation 508, meter reading application server 302 generates route log packages to include routes and the secured commands. As an example, a route log package may include route 108 with unique commands (e.g., collect demand values and reset demand instructions) for each of nodes 102A-102N. Route package generation module 312 may be configured to verify that each route includes a correct list of meters, correct secured commands and that routes in route log packages are correctly associated with each corresponding mobile device 104. Therefore, route package generation module 312 may be configured to generate route log packages to include routes and at least portions of the secured commands, and provide the route log packages to one or more wireless mobile devices 104.

At operation 510, meter reading application server 302 provides the route log packages to one or more wireless mobile devices, such as mobile device 104. Therefore, verifying that no two or more identical secured commands for a meter are generated having different tracking identifiers may allow the meter to determine a replay upon receiving two or more of the identical secured commands from the one or more wireless mobile devices.

Alternatively, in view of environment 200 of FIG. 2, after operation 506, central office 114 may transmit (e.g., sequentially transmit, batch transmit or broadcast) secured commands to meters, such as nodes 102A-102N. Central office 114 may then receive demand values from nodes 102A-102N. Central office 114 may determine nodes that have not provided demand values, and retransmit secured commands to those nodes until all demand values are received from all corresponding nodes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A meter, configured to reduce at least one of data loss at the meter, data loss in a network, or network traffic, the meter comprising:
    one or more processors;
    memory communicatively coupled to the one or more processors;
    a metrology module stored in the memory and configured to, when executed by the one or more processors, collect values in one or more registers; and
    a communications module stored in the memory and configured to, when executed by the one or more processors:
        receive a first command in a first radio frequency (RF) message, wherein the first command comprises a first tracking identifier (ID) that is unique with respect to a first collection cycle of a plurality of collection cycles;
        determine whether or not the first command is valid, wherein validity techniques reduce network traffic by dis-incentivizing transmission of invalid demand reset commands, and wherein determining whether or not the first command is valid comprises:
            comparing a hash of the first command to a valid hash result; or
            decrypting the first command;
        in response to determining that the first command is valid:
            obtaining, from the one or more registers, demand values for the first collection cycle;
            storing the demand values in a log prior to RF transmission, to thereby prevent data loss if RF transmission fails;
            transmitting a first RF response message that includes the demand values for the first collection cycle; and
            resetting the one or more registers to clear the demand values from the one or more registers;
        receive a second command in a second RF message, the second command comprises a second tracking ID;
        determine whether or not the second command is a replay, wherein the determining whether or not the second command is a replay is based at least in part on a comparison of the second tracking ID to the first tracking ID that is unique with respect to the first collection cycle;
        in response to determining that the second command is valid and that the second command is a replay:
            restoring data lost in the first RF response message by retrieving the demand values from the log; and
            transmitting a second RF response message that includes the demand values; and in response to determining that the second command is not valid:
    transmitting an RF response message that does not include the demand values.

2. The meter recited in claim 1, wherein the demand values comprise peak load demand information and/or peak load usage information pertaining to a resource measured by the meter.

3. The meter recited in claim 1, wherein:
the first command includes a collect demand data request and a reset demand instruction;
the reset demand instruction causes the communications module to reset the one or more registers to clear the demand values from the one or more registers; and
the collect demand data request causes the communications module to obtain the demand values for the first collection cycle and transmit the first RF response message that includes the demand values.

4. The meter recited in claim 1, wherein the communications module is configured to, in response to determining that the second command is a replay:
    generate a replay indication; and
    insert the replay indication into the RF response message prior to transmitting the RF response message.

5. The meter recited in claim 1, wherein the communications module is configured to compare the first tracking ID in the first command with tracking IDs in a list of previously received demand reset commands.

6. The meter recited in claim 5, wherein the communications module is configured to, in response to determination of a replay, not reset the values in the one or more registers.

7. The meter recited in claim 5, wherein the first tracking ID is associated with a secured command and a specific meter.

8. The meter recited in claim 1, wherein the communications module is configured to, in response to determining that the first command is not valid:
    generate a security failure response; and
    transmit an RF response message that includes the security failure response.

9. The meter recited in claim 1, wherein the demand values comprise peak load demand information or peak load usage information pertaining to a resource measured by the meter prior to a reset of the demand values in the one or more registers, and any RF response message transmitted includes at least one of:
    a status of the reset of the demand values;
    time information corresponding to the reset of the demand values; or
    a time of occurrence of a time interval associated with the peak load demand information or the peak load usage information.

10. The meter recited in claim 1, wherein the demand values are stored in the log in response to determining that the first command is not a replay.

11. One or more non-transitory computer-readable media storing instructions that, when executed by one or more processors of a meter, reduce at least one of data loss at the meter, data loss in a network, or network traffic, and perform acts comprising:
    receiving, at a meter, a first command wirelessly from a device, wherein the first command requests one or more values related to peak load demand or peak load usage of a resource, and wherein the first command comprises a first tracking identifier (ID) that is unique with respect to a first collection cycle of a plurality of collection cycles;
    determining whether or not the first command is valid, wherein validity techniques reduce network traffic by dis-incentivizing transmission of invalid demand reset commands, and wherein determining whether the first command is valid comprises at least one of:
        comparing a hash of the first command to a valid hash result; or
        decrypting the first command;
    in response to determining that the first command is valid:
        obtaining, from one or more registers of the meter, the one or more values for the first collection cycle;
        storing the demand values in a log prior to RF transmission, to thereby prevent data loss if RF transmission fails;
        transmitting a first wireless response message that includes the one or more values; and
        resetting the one or more registers to clear the one or more values from the one or more registers;
    receiving a second command wirelessly from the device, wherein the second command comprises a second tracking ID;
    determining whether or not the second command is a replay, wherein the determining whether or not the second command is a replay is based at least in part on a comparison of the first tracking ID for the first collection cycle to the second tracking ID;
    restoring data lost in the first wireless response message by obtaining, if the second command is valid and is based at least in part on determining that the second command is a replay, the one or more values from the log of the meter; and
    transmitting a second wireless response message that includes the one or more values if the second command was determined to be valid, and does not include the one or more values if the second command was determined to be not valid.

12. The one or more non-transitory computer-readable media recited in claim 11, wherein determining whether or not the second command is the replay is based at least in part on comparing the second tracking ID in the second command to tracking IDs of previously received demand reset commands.

13. The one or more non-transitory computer-readable media recited in claim 12, wherein:
    when the second tracking ID of the second command does not match a tracking ID of a previously received command, the second command is determined to not be the replay and the one or more registers are reset; and
    when the second tracking ID of the second command matches a tracking ID of a previously received command, the second command is determined to be the replay and the one or more registers are not reset.

14. The one or more non-transitory computer-readable media recited in claim 12, wherein the first tracking ID is associated with a secured reset demand command that is unique to the meter.

15. The one or more non-transitory computer-readable media recited in claim 11, the acts further comprising:
    in response to determining that the second command is not a replay:
        copying the one or more values from the one or more registers of the meter to the log; and
        resetting the one or more registers.

16. The one or more non-transitory computer-readable media recited in claim 11, the acts further comprising:
  in response to determining that the second command is a replay:
    obtaining the one or more values from the log;
    generating a replay indication; and
    generating the second wireless response message to include the one or more values and the replay indication.

17. The one or more non-transitory computer-readable media recited in claim 11, wherein the resource is measured by the meter.

18. The one or more non-transitory computer-readable media recited in claim 11, wherein the second wireless response message further includes at least one of:
  time information corresponding to a resetting of the one or more registers; or
  a time of occurrence of a time interval associated with the peak load demand or the peak load usage of the resource.

19. A method, to reduce at least one of data loss at a meter device, data loss in a network, or network traffic, the method comprising:
  receiving, at the metering device, a first radio frequency (RF) message including a first command, the first command including a first tracking identifier (ID) that is associated with a first collection cycle of the metering device for a period of time;
  determining that the first command is valid, wherein validity techniques reduce network traffic by dis-incentivizing transmission of invalid demand reset commands;
  based at least in part on determining that the first command is valid:
    obtaining, from one or more registers of the metering device, one or more demand values corresponding to the first collection cycle;
    storing the demand values in a log prior to RF transmission, to thereby prevent data loss if RF transmission fails;
    transmitting a first RF response message that includes the one or more demand values corresponding to the first collection cycle; and
    resetting the one or more registers to clear the one or more demand values from the one or more registers;
  receiving, at the metering device, a second RF message including a second command, the second command including a second tracking ID;
  determining that the second command is a replay based at least in part on a comparison between the first tracking ID and the second tracking ID; and
  based at least in part on determining that the second command is a replay:
    restoring data lost in the first RF response message by retrieving the one or more demand values from the log; and
    transmitting a second RF response message that includes the one or more demand values corresponding to the first collection cycle.

* * * * *